US010915552B2

(12) United States Patent
Camenisch et al.

(10) Patent No.: US 10,915,552 B2
(45) Date of Patent: Feb. 9, 2021

(54) DELEGATING CREDENTIALS WITH A BLOCKCHAIN MEMBER SERVICE

(71) Applicant: International Business Machines Corporation, Armonk, NY (US)

(72) Inventors: Jan L. Camenisch, Rueschlikon (CH); Manu Drijvers, Rüschlikon (CH); Maria Dubovitskaya, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 16/021,333

(22) Filed: Jun. 28, 2018

(65) Prior Publication Data

US 2020/0004846 A1      Jan. 2, 2020

(51) Int. Cl.
| | | |
|---|---|---|
| *H04L 29/06* | (2006.01) | |
| *G06F 16/27* | (2019.01) | |
| *G06F 16/18* | (2019.01) | |
| *G06F 16/182* | (2019.01) | |
| *H04L 9/32* | (2006.01) | |

(52) U.S. Cl.
CPC .......... *G06F 16/27* (2019.01); *G06F 16/1805* (2019.01); *G06F 16/1834* (2019.01); *H04L 9/3247* (2013.01); *H04L 9/3263* (2013.01); *H04L 2209/38* (2013.01)

(58) Field of Classification Search
CPC ...................................................... G06F 16/27
See application file for complete search history.

(56) References Cited

U.S. PATENT DOCUMENTS

| | | | |
|---|---|---|---|
| 8,769,642 B1 | 7/2014 | O'Neill et al. | |
| 8,839,381 B2 | 9/2014 | Nguyen et al. | |
| 8,955,035 B2 | 2/2015 | Belinkiy et al. | |
| 9,948,467 B2* | 4/2018 | King | .................. H04L 63/0876 |
| 10,454,683 B2* | 10/2019 | Weimer | ................. H04L 9/3239 |
| 10,504,179 B1* | 12/2019 | McGuire | ................. G06Q 40/04 |
| 2015/0278820 A1* | 10/2015 | Meadows | .......... G06Q 20/3821 |
| | | | 705/64 |
| 2017/0046694 A1* | 2/2017 | Chow | ................... G06Q 10/103 |
| 2017/0109955 A1* | 4/2017 | Ernest | .................... H04L 9/3257 |
| 2017/0155515 A1 | 6/2017 | Androulaki et al. | |
| 2018/0048461 A1 | 2/2018 | Jutla et al. | |
| 2018/0117447 A1* | 5/2018 | Tran | ....................... G16H 80/00 |

(Continued)

OTHER PUBLICATIONS

Garman, et al., Decentralized Anonymous Credentials, IACR Cryptology e-Print Archive, 2013.

(Continued)

*Primary Examiner* — Shawnchoy Rahman

(57) ABSTRACT

An example operation may include one or more of receiving a signed transaction from a blockchain member device, responsive to receiving the signed transaction, identifying a credential assigned to the blockchain member device, and the credential certifies a public key is assigned to the blockchain member device and was used to sign the signed transaction, determining whether to commit the signed transaction to a blockchain based on the credential, and responsive to determining to commit the signed transaction based on the credential, storing the signed transaction anonymously in the blockchain.

20 Claims, 10 Drawing Sheets

(56) References Cited

U.S. PATENT DOCUMENTS

2018/0356236 A1* 12/2018 Lawrenson ......... H04L 67/1097
2019/0165949 A1* 5/2019 Ramos .................. G06F 21/645

OTHER PUBLICATIONS

Blomer et al: "Delegatable Attribute-Based Anonymous Credentials from Dynamically Malleable Signatures", Jun. 10, 2018 (Jun. 10, 2018}, International Conference on Computer Analysis of Images and Patterns. CAIP 2017: Computer Analysis of Images and Patterns; [Lecture Notes in Computer Science; Lect.Notes Computer], Springer, Berlin, Heidelberg, p. 221.
Camenisch et al: "Practical UC-Secure Delegatable Credentials with Attributes and Their Application to Blockchain", Proceedings of the 2017 ACM SIGSAC Conference on Computer and Communications Security 'ccs' 17, Jan. 1, 2017 (Jan. 1, 2017), pp. 683-699.
International Search Report and Written Opinion issued in the corresponding International Application No. PCT/EP2019/065708, dated Aug. 1, 2019.

\* cited by examiner

DELEGATING CREDENTIALS WITH A BLOCKCHAIN MEMBER SERVICE

TECHNICAL FIELD

This application generally relates to management of credentials, and more particularly, to using a blockchain infrastructure to provide member service capabilities for delegating credentials with a blockchain member service.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, privacy-preserving attribute-based credentials (PABCs) permit users to authenticate via their user devices anonymously and without traceability when attempting to access service providers. Every time a user device is configured to "show" a PABC, the device creates a new and untraceable proof of possession of such credentials, while selectively disclosing only certain attributes from the credential or only proving that the attributes satisfy certain predicates. Only the issued key is needed to verify the event. However, the identity of the issuer might pose privacy and traceability issues which can lead to the leakage of certain user information. If different issuers issue the same type of credentials then the issuer public key can provide information about a user's location, organization, or a private unit that issues such credentials.

In one example, a distributed certificate authority (CA) service, for example, may be a membership service of a permissioned blockchain. All members of the blockchain are issued certificates to submit and verify transactions, possible in a completely untraceable and anonymous way. In such scenarios, with the distributed trust and the many parties/users involved, the membership service cannot be a single entity. However, if the local CAs are organization-based, then the CA's public key used for verification can provide traceability and provide some information about the transaction submitter or his/her organization.

Delegatable anonymous credentials (DAC), were created to allegedly solve this problem. DACs permit the owner of a credential to delegate this credential to another user, who, in turn, can delegate it further and/or use it in an anonymous and untraceable way, while hiding his/her own identity and the identity of the delegator. Thus, only the public key of the initial delegator (at the root of the chain) is required for verification purposes. In the example of a permissioned blockchain, this approach would permit the root membership service to delegate the credential issuance to a "local" membership service without compromising the privacy properties. Delegatable credentials are not common and also have drawbacks, for example, they may be limited to only a specific number of delegations. The size of a credential is exponential in the number of delegations, which also makes them impractical for standard platforms. One conventional construction employs non-interactive zero-knowledge proofs and a randomization property, which permits for a polynomial number of delegations.

Another approach of a delegatable credential system supports non-interactive issuing and delegation of credentials. Still another example proposed a DAC instantiation that is also non-interactive and scales only linearly with the number of delegation but is proven secure under a standard (decision linear) assumption. Although those known proposed solutions already offer advanced functionalities with strong privacy guarantees, the constructions are still not very practical, and the efficiency is critical with any blockchain application. Furthermore, those proposed DAC schemes and the corresponding security definitions do not consider attributes on different delegation levels. When a DAC system is used in the blockchain context for the membership service, the root delegator cannot be a single entity, therefore, a support for the threshold signatures is required for delegation, also on different levels. From the security perspective, the known constructions require a common reference string (CRS) model. Those challenges raise practicality standards when attempting to deploy a DAC security model.

SUMMARY

One example embodiment may provide a method that includes one or more of receiving a signed transaction from a blockchain member device, responsive to receiving the signed transaction, identifying a credential assigned to the blockchain member device, and the credential certifies a public key is assigned to the blockchain member device and was used to sign the signed transaction, determining whether to commit the signed transaction to a blockchain based on the credential, and responsive to determining to commit the signed transaction based on the credential, storing the signed transaction anonymously in the blockchain.

Another example embodiment may include a system that includes a blockchain member device and a computing device configured to at least one of receive a signed transaction from the blockchain member device, responsive to the signed transaction being received, identify a credential assigned to the blockchain member device, the credential certifies a public key is assigned to the blockchain member device and was used to sign the signed transaction, determine whether to commit the signed transaction to a blockchain based on the credential, and responsive to a determination to commit the signed transaction based on the credential, store the signed transaction anonymously in the blockchain.

Still another example embodiment may include a non-transitory computer readable storage medium configured to store instructions that when executed cause a processor to perform at least one of receiving a signed transaction from a blockchain member device, responsive to receiving the signed transaction, identifying a credential assigned to the blockchain member device, wherein the credential certifies a public key is assigned to the blockchain member device and was used to sign the signed transaction, determining whether to commit the signed transaction to a blockchain based on the credential, and responsive to determining to commit the signed transaction based on the credential, storing the signed transaction anonymously in the blockchain.

DETAILED DESCRIPTION

Figure 1A:
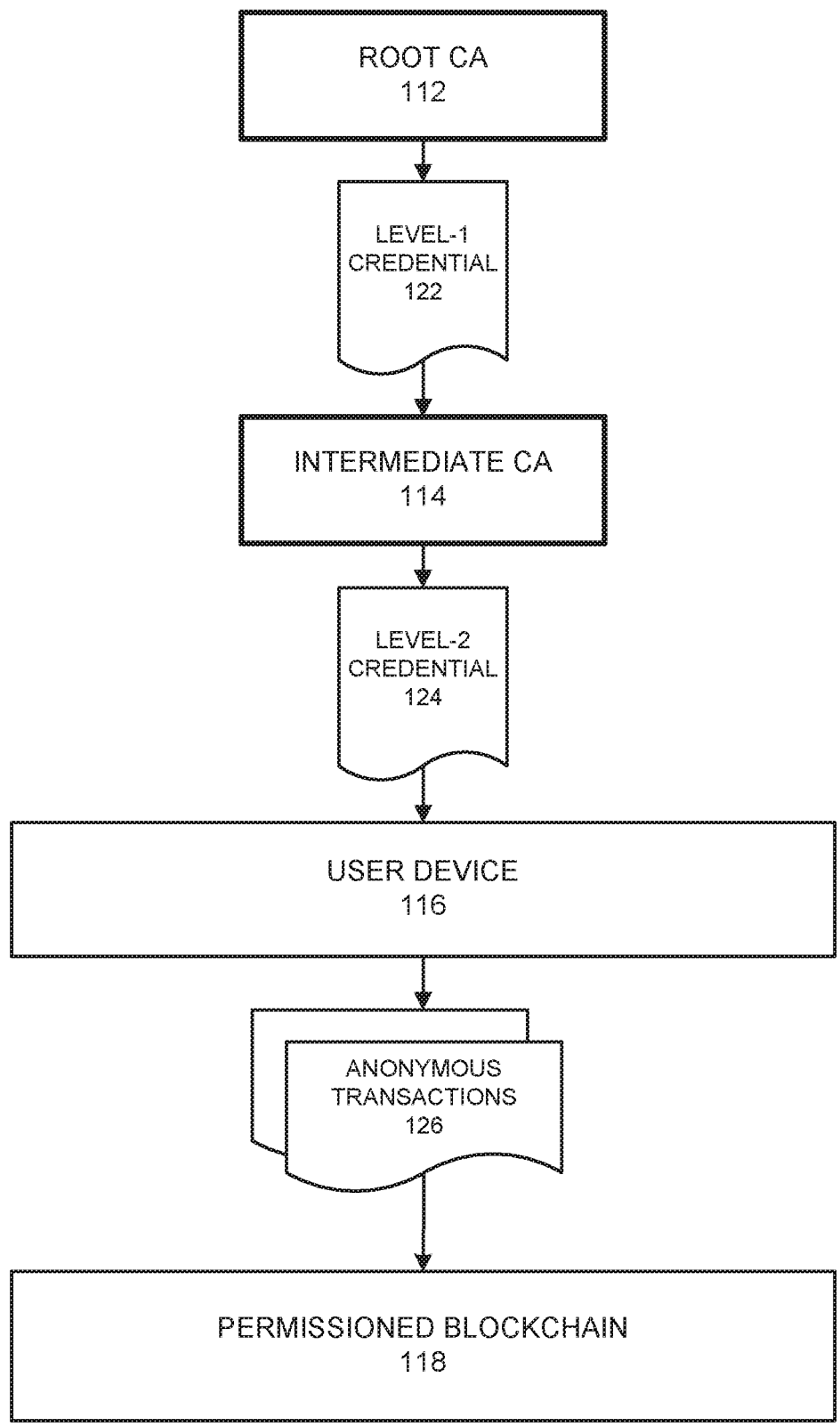
FIG. 1A illustrates a logic diagram of a credential management configuration operating with a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide DAC security based on a blockchain infrastructure. The approach includes multiple delegation levels, attributes on all delegation levels, selective delegation of the credentials, which avoids the "all-or-nothing" delegation requirement, and support of threshold signatures for group delegation on all levels. The approach is based on an efficient structure-preserving signature scheme and interactive zero-knowledge proofs. However, this customized construction can also be made non-interactive by switching to a random model.

In operation, a user device generates a secret and a corresponding public key and also a new key pair for every identified credential. A user profile/user device is issued a credential certifying both public keys and possibly certain attributes. A user profile can delegate the credential further to another user profile by signing another credential using his/her secret key and also proving with 'zero-knowledge' that the public key that corresponds to the signing key was signed by the previous key delegator. This delegation credential system is based on a practical application, such as a distributed membership service for a permissioned blockchain.

The membership service can be implemented with DAC based on certain procedures. The membership service may include a root CA that delegates the certificate issuance to the local CAs. To avoid a single point of trust with the root CA, a threshold signature scheme may be used. The first level of delegation is performed in a distributed fashion and also supports attributes. A blockchain member is issued an attribute-based credential by one of the local CAs through another level of delegation. When a member uses this credential to sign a transaction and selectively disclose attributes, the verification is performed with respect to the root CA's public key. The number of delegation levels can be increased and collective delegation and attributes can be supported on different levels.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1A illustrates a logic diagram of a credential management configuration operating with a blockchain network, according to example embodiments. Referring to FIG. 1A, the configuration 100 provides a root certificate authority as an entity responsible for issuing credentials to members of a blockchain. The root CA 112 can issue level-1 credentials 122 and the other credential authorities cannot offer such level-1 credentials. When a device or profile associated with a device, as a member of the network, is issued a level-1 credential, then that device can issue leve-2 credentials 124, such as intermediate CA 114. The devices that received level-1 credentials become intermediate CAs 114 and can delegate credentials to other members, such as user devices 116 seeking access to the blockchain network. Each device receiving a certificate (level 'i') can then issue credentials (i+1) to other members.

In one example an organization may designate a single root CA 112 and multiple intermediate CAs (not shown). This may be a likely scenario is a large scale enterprise with multiple departments, where each department has its own intermediate CA. Those intermediate CAs may then issue level-2 credentials to user devices. The result is the user devices have access to the blockchain 118 and can delegate transactions accordingly 126. The transactions can be anonymous since the blockchain is setup to approve transactions with a certificate not a specific profile.

Figure 1B:
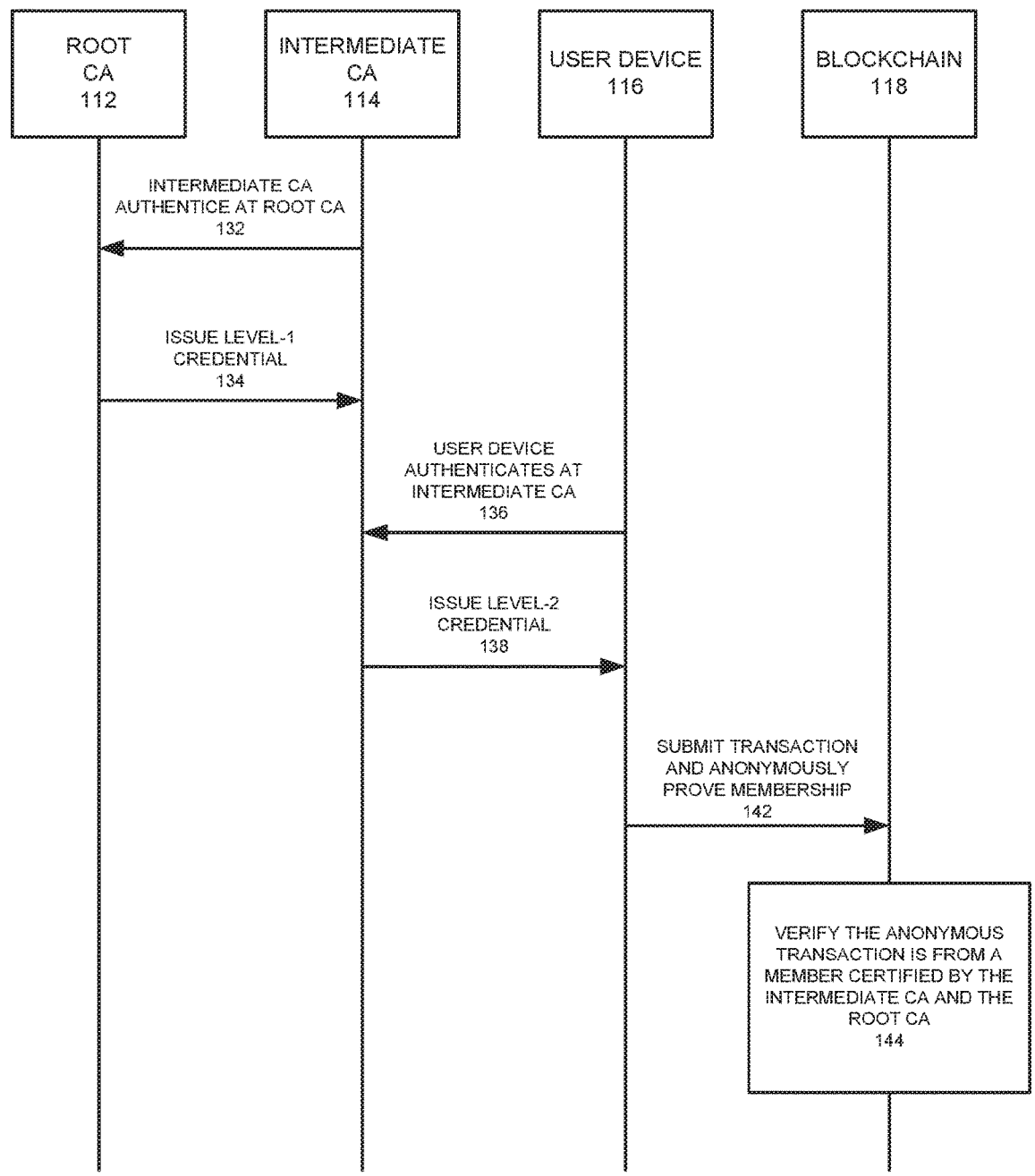
FIG. 1B illustrates a system diagram of a credential management configuration operating with a blockchain network, according to example embodiments.

FIG. 1B illustrates a system diagram of a credential management configuration operating with a blockchain network, according to example embodiments. Referring to FIG. 1B, the configuration 150 provides a root CA 112 authenticating 132 certain member intermediate CAs 114. The result of the authentication is issuance of a level-1 credential 134. As the user devices 116 on the network seek to receive access to the blockchain, the user devices 116 may authenticate 136 at the intermediate CAs 114, the result of the authentication is the issuance of a level-2 credential 138. The user devices 116 are then able to submit transactions anonymously and to prove membership 142 to the blockchain members. The peers of the blockchain 118 may be configured via a smart contract to identify credentials not user profiles specifically. This certificate provides a way to anonymously submit transactions for review and committal to the blockchain 118 since the certificate is an identifier of the root CA and the intermediate CA but not the user profile or the user device. Once the root CA and intermediate CA are identified, the peers accept the transaction to the blockchain 144.

Figure 2A:
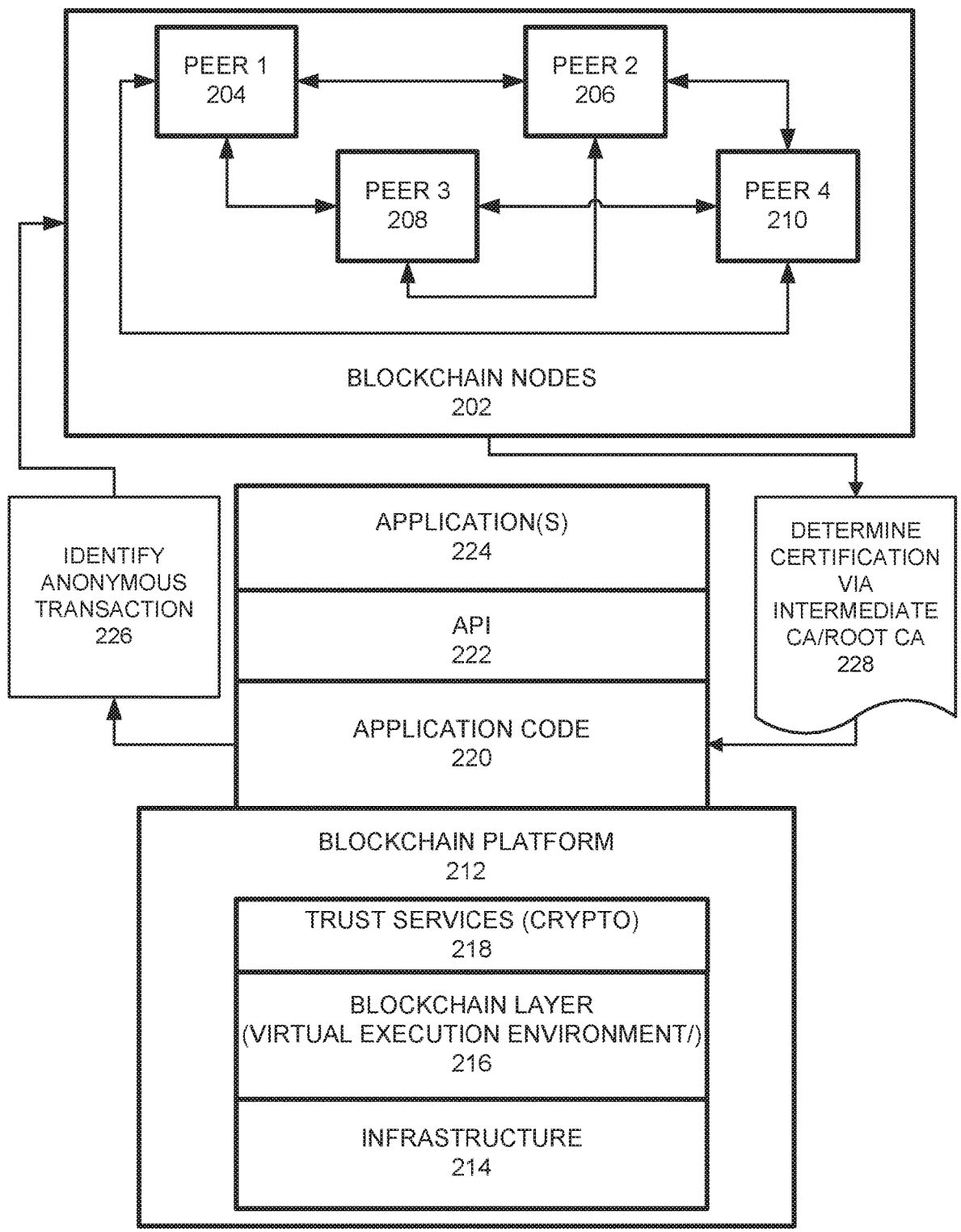
FIG. 2A illustrates an example peer node blockchain architecture configuration for performing blockchain modification operations, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the stored identifier and the hash created from the stored identifier template data match, then the chaincode sends an authorization key to the requested service. The chaincode may write to the blockchain data associated with the cryptographic details. In FIG. 2A, in one example, a transaction may be identified from a user device as an anonymous transaction 226. The peers 202 may require identification via a certification granted by a known intermediate certificate authority and/or a root certificate authority 228. Once the certificate is identified, the transaction may be accepted by the peers.

Figure 2B:
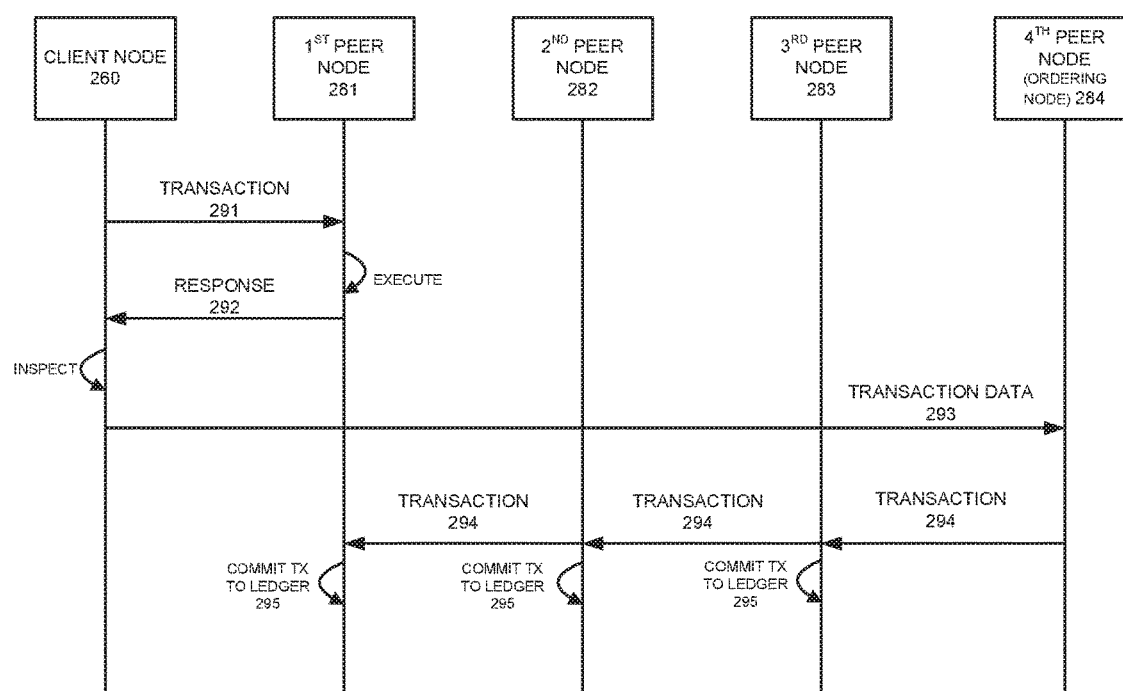
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
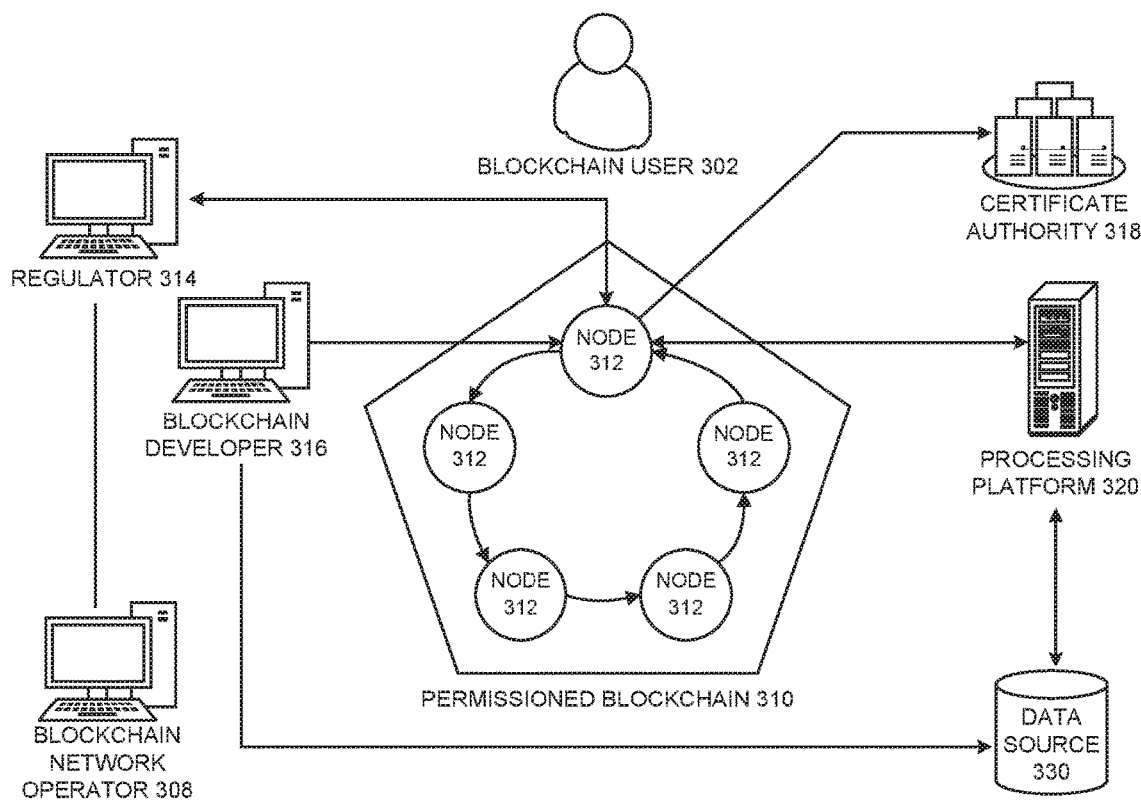
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
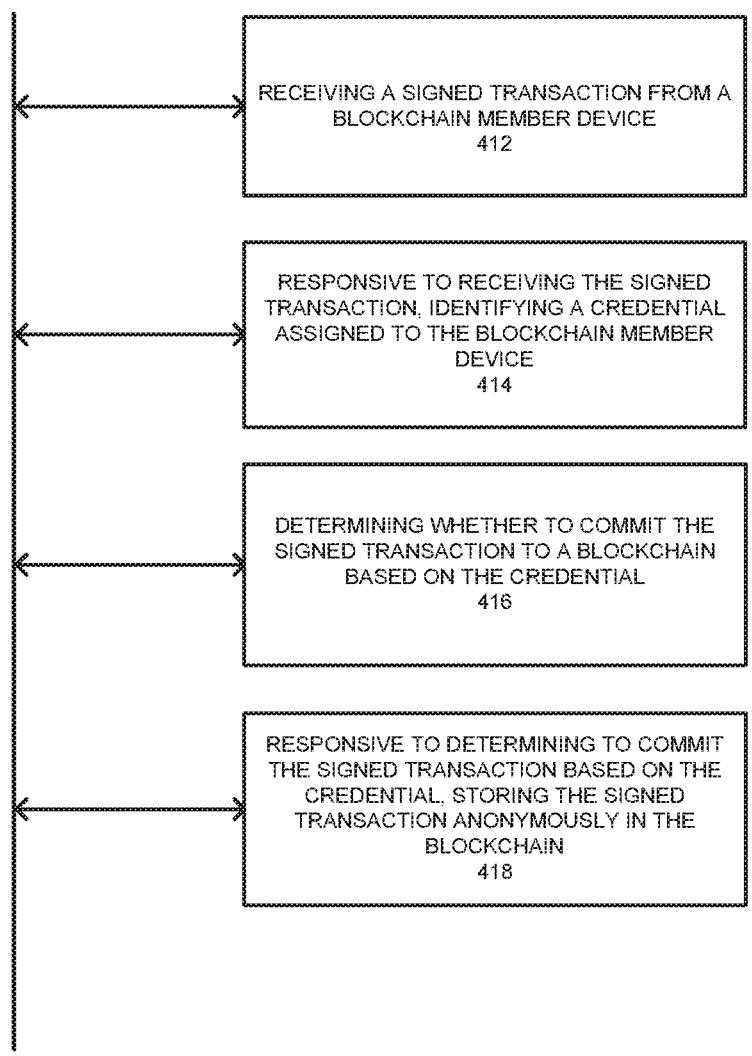
FIG. 4 illustrates a flow diagram of an example credential management configuration, according to example embodiments.

FIG. 4 illustrates a flow diagram of an example credential management configuration, according to example embodiments. Referring to FIG. 4, the method 400 includes receiving a signed transaction from a blockchain member device 412, responsive to receiving the signed transaction, identifying a credential assigned to the blockchain member device, and the credential certifies a public key is assigned to the blockchain member device and was used to sign the signed transaction 414, determining whether to commit the signed transaction to a blockchain based on the credential 416, and responsive to determining to commit the signed transaction based on the credential, storing the signed transaction anonymously in the blockchain 418. The method may also include identifying one or more attributes associated with the signed transaction, and the one or more attributes associated with the signed transaction are selected by the blockchain member device.

The one or more attributes indicate a root certificate authority that issued a root credential to an intermediate certificate authority that issued the credential to the user device. The method may also include assigning the credential to the blockchain member device by one of a plurality of intermediate certificate authorities, receiving an authentication request at a root certificate authority from an intermediate certificate authority, and responsive to receiving the authentication request, assigning a root credential to the intermediate certificate authority. The method may also provide receiving another authentication request at the intermediate certificate authority from the blockchain member device, and responsive to receiving the other authentication request, assigning the credential to the blockchain member device. The method may also include verifying that the signed transaction was submitted by an anonymous member certified by the intermediate certificate authority and that the intermediate certificate authority was assigned the root credential by the root certificate authority.

Figure 5:
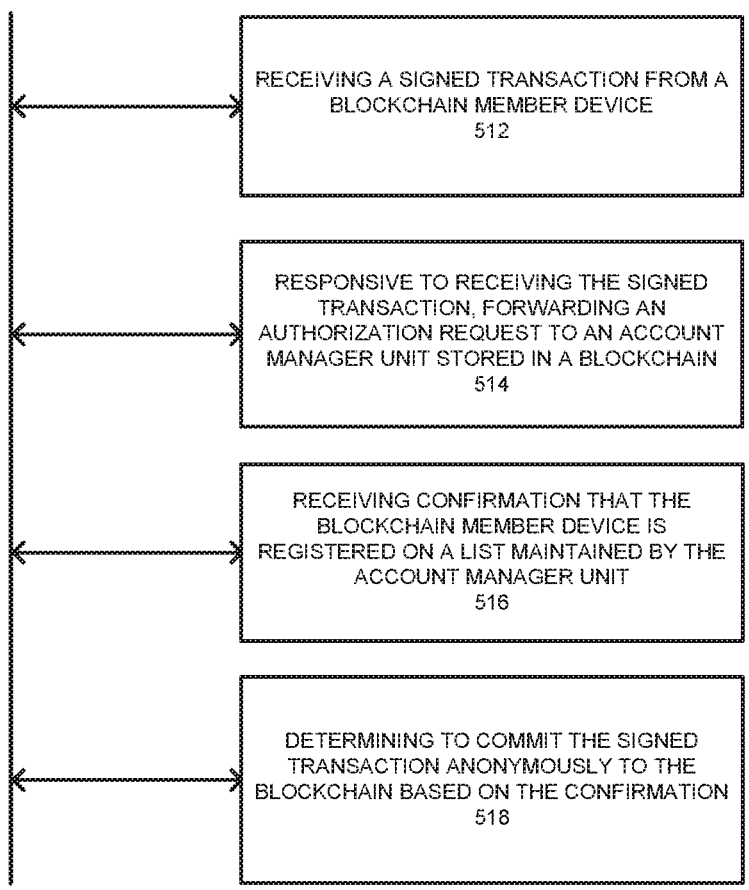
FIG. 5 illustrates a flow diagram of another example credential management configuration, according to example embodiments.

FIG. 5 illustrates a flow diagram of another example credential management configuration, according to example embodiments. Referring to FIG. 5, the method 500 may include receiving a signed transaction from a blockchain member device 512, responsive to receiving the signed transaction, forwarding an authorization request to an account manager unit stored in a blockchain 514, receiving confirmation that the blockchain member device is registered on a list maintained by the account manager unit 516, and determining to commit the signed transaction anonymously to the blockchain based on the confirmation 518.

In addition to having multiple tiers of certificate authorities granting credentials to lesser tiered entities, the anonymous transaction management may be performed by a central blockchain-based account manager entity that is configured to maintain a list of those entities that are to be recognized as accounts which are registered with the central account manager unit. Then those transactions from the registered devices can be made anonymously since they are checked for registration with the central account manager unit but are otherwise not identifiable from the transaction via third parties.

Figure 6A:
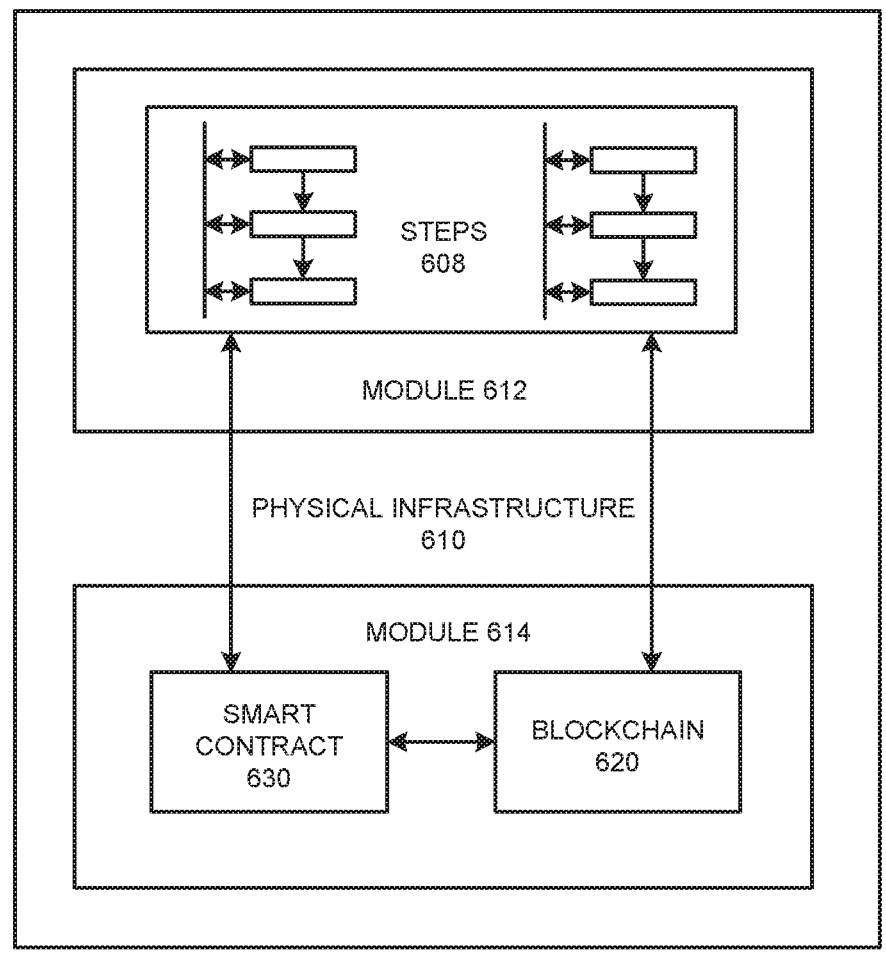
FIG. 6A illustrates an example physical infrastructure configured to perform various operations on the blockchain in accordance with one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
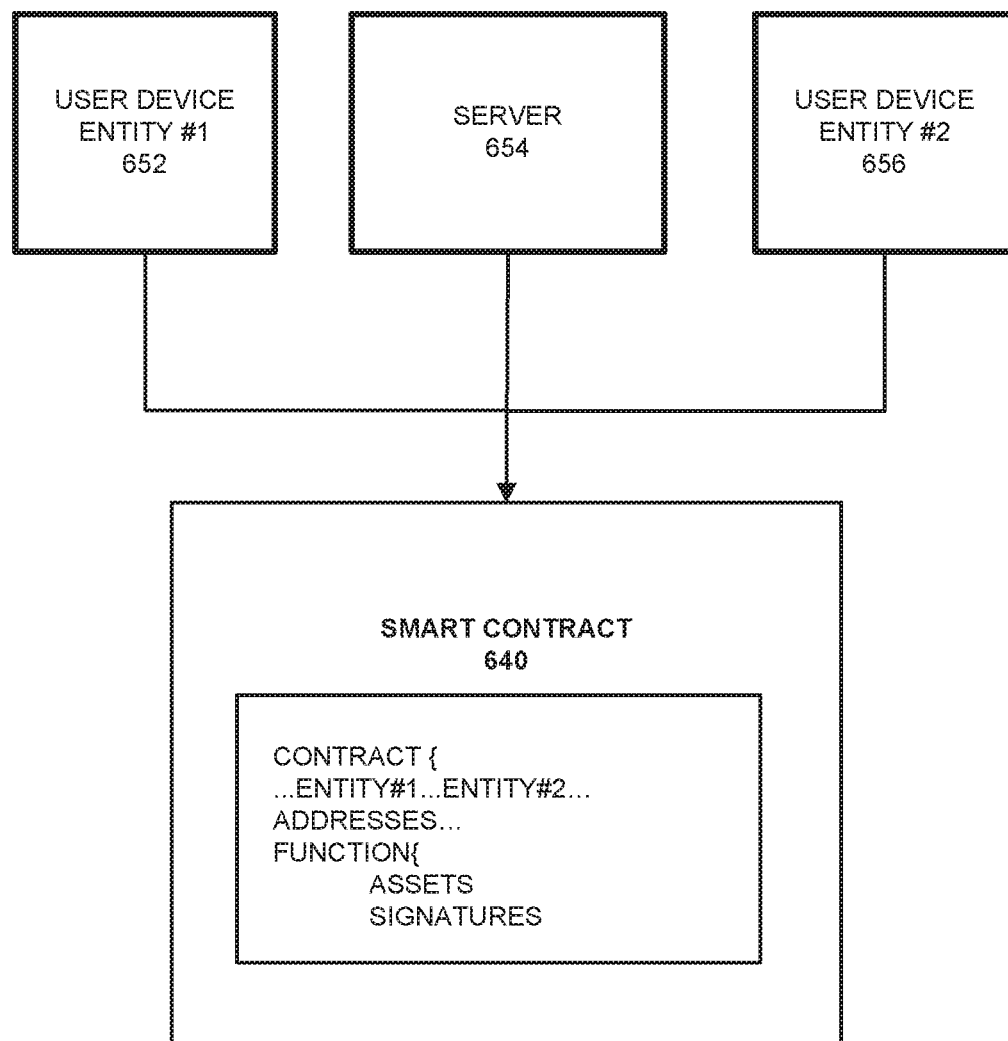
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
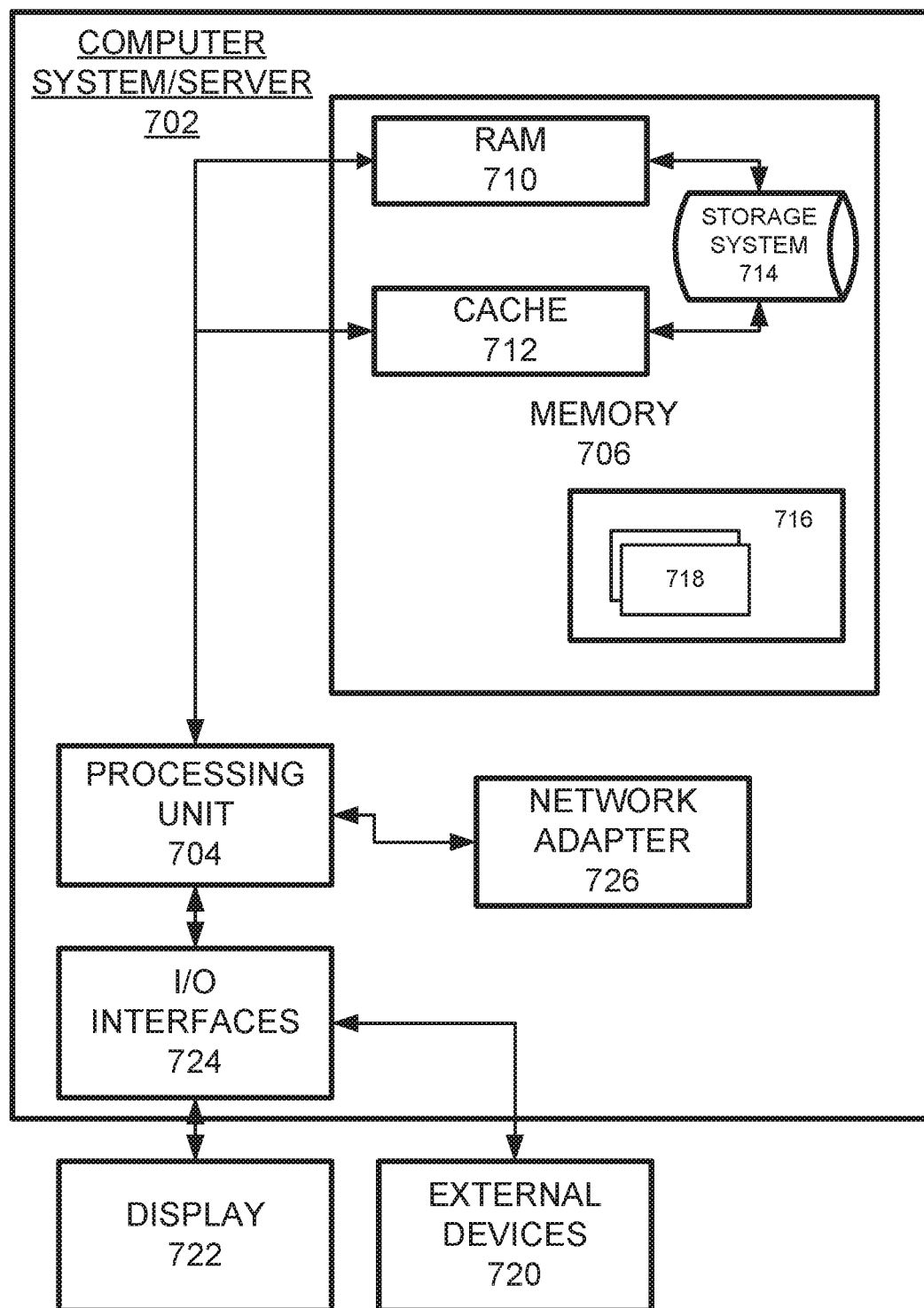
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving a signed transaction from a blockchain member device;
   responsive to receiving the signed transaction, identifying a credential assigned to the blockchain member device, wherein the credential certifies a public key is assigned to the blockchain member device and was used to sign the signed transaction;

determining whether to commit the signed transaction to a blockchain based on the credential; and responsive to determining to commit the signed transaction based on the credential, storing the signed transaction anonymously in the blockchain.

2. The method of claim 1, further comprising:

identifying one or more attributes associated with the signed transaction, wherein the one or more attributes associated with the signed transaction are selected by the blockchain member device.

3. The method of claim 2, wherein the one or more attributes indicate a root certificate authority that issued a root credential to an intermediate certificate authority that issued the credential to the user device.

4. The method of claim 1, further comprising:

assigning the credential to the blockchain member device by one of a plurality of intermediate certificate authorities.

5. The method of claim 1, further comprising:

receiving an authentication request at a root certificate authority from an intermediate certificate authority; and responsive to receiving the authentication request, assigning a root credential to the intermediate certificate authority.

6. The method of claim 5, further comprising:

receiving a second authentication request at the intermediate certificate authority from the blockchain member device;

responsive to receiving the second authentication request, assigning the credential to the blockchain member device.

7. The method of claim 6, further comprising:

verifying that the signed transaction was submitted by an anonymous member certified by the intermediate certificate authority and that the intermediate certificate authority was assigned the root credential by the root certificate authority.

8. A system, comprising:

a blockchain member device;

a computing device configured to receive a signed transaction from the blockchain member device;

responsive to the signed transaction received, identify a credential assigned to the blockchain member device, wherein the credential certifies a public key is assigned to the blockchain member device and was used to sign the signed transaction;

determine whether to commit the signed transaction to a blockchain based on the credential; and responsive to a determination to commit the signed transaction based on the credential, store the signed transaction anonymously in the blockchain.

9. The system of claim 8, wherein the computing device is further configured to identify one or more attributes associated with the signed transaction, wherein the one or more attributes associated with the signed transaction are selected by the blockchain member device.

10. The system of claim 9, wherein the one or more attributes indicate a root certificate authority that issued a root credential to an intermediate certificate authority that issued the credential to the user device.

11. The system of claim 9, further comprising a plurality of intermediate certificate authorities configured to assig the credential to the blockchain member device.

12. The system of claim 8, further comprising:

a root certificate authority configured to receive an authentication request from an intermediate certificate authority, and responsive to the authentication request received, assign a root credential to the intermediate certificate authority.

13. The system of claim 12, wherein the intermediate certificate authority is configured to receive a second authentication request from the blockchain member device, and responsive to the second authentication request being received, assign the credential to the blockchain member device.

14. The system of claim 13, wherein the computing device is further configured to verify that the signed transaction was submitted by an anonymous member certified by the intermediate certificate authority and that the intermediate certificate authority was assigned the root credential by the root certificate authority.

15. A non-transitory computer readable storage medium configured to store instructions that when executed cause a processor to perform:

receiving a signed transaction from a blockchain member device;

responsive to receiving the signed transaction, identifying a credential assigned to the blockchain member device, wherein the credential certifies a public key is assigned to the blockchain member device and was used to sign the signed transaction;

determining whether to commit the signed transaction to a blockchain based on the credential; and responsive to determining to commit the signed transaction based on the credential, storing the signed transaction anonymously in the blockchain.

16. The non-transitory computer readable storage medium of claim 15, wherein the processor is further configured to perform:

identifying one or more attributes associated with the signed transaction, wherein the one or more attributes associated with the signed transaction are selected by the blockchain member device.

17. The non-transitory computer readable storage medium of claim 16, wherein the one or more attributes indicate a root certificate authority that issued a root credential to an intermediate certificate authority that issued the credential to the user device.

18. The non-transitory computer readable storage medium of claim 15, wherein the processor is further configured to perform:

assigning the credential to the blockchain member device by one of a plurality of intermediate certificate authorities.

19. The non-transitory computer readable storage medium of claim 15, wherein the processor is further configured to perform:

receiving an authentication request at a root certificate authority from an intermediate certificate authority; and responsive to receiving the authentication request, assigning a root credential to the intermediate certificate authority.

20. The non-transitory computer readable storage medium of claim 19, wherein the processor is further configured to perform:

receiving a second authentication request at the intermediate certificate authority from the blockchain member device;

responsive to receiving the second authentication request, assigning the credential to the blockchain member device; and verifying that the signed transaction was submitted by an anonymous member certified by the intermediate certificate authority and that the intermediate certificate authority was assigned the root credential by the root certificate authority.

* * * * *